United States Patent Office 3,264,993
Patented August 9, 1966

3,264,993
COMBUSTIBLE CARTRIDGE CASE COMPOSITION AND PROCESS
Myron G. De Fries, Fairfax County, and John N. Godfrey, Alexandria, Va., assignors to Atlantic Research Corporation, Fairfax County, Va., a corporation of Virginia
No Drawing. Filed Apr. 22, 1965, Ser. No. 450,215
18 Claims. (Cl. 102—43)

This invention relates to a new and improved composition for making shaped, felted, fibrous combustible product having advantageous physical properties when cured and dried. More specifically, it relates to a composition containing a new and improved thermosetting resin binder for the fiber components of the product. It further relates to the method for preparing the combustible product.

Broadly speaking, the invention relates to a composition for making combustible product, said composition comprising nitrocellulose fibers, cellulose fibers, and water-dispersed thermosetting, adhesive, resin binder composition comprising self-reactive copolymer of vinyl acetate with at most about 10% of other specific comonomers homogenously dispersed in water.

Particularly, the invention includes the composition comprising a homogenous dispersion in water of the following ingredients: (a) dispersed fibers consisting essentially of nitrocellulose fibers and cellulose fibers in the ratio range of 1 to about 99 parts by weight of nitrocellulose fibers to about 1 to 5 parts of cellulose fibers, and (b) resin binder in an amount sufficient to bind said fibers into a rigid mass when cured and dried, said binder being compatible with said nitrocellulose and consisting essentially of a water-dispersed, thermosetting adhesive resin composition comprising a self-reactive, aqueous emulsion copolymer containing at least 90%, by weight, of vinyl acetate together with at least one other polymerizable comonomer containing at least one functional group selected from the group consisting of the glycidyl, methylol, including lower alkyl methylol, ureido, including lower alkene ureido, hydroxyl, amine, carboxyl, and alkoxycarbonyl groups, said copolymer preferably having a molecular weight in the range 2000–100,000. Preferably, the weight ratio of the binder to the total weight of fibers, both measured on dry basis, lies in the range of from about 1:1 to about 1:7.

Our composition contains a novel resin binder which makes possible an aqueous system which is much safer to use in a manufacturing process than non-aqueous systems of the prior art. When heated to temperatures sufficient to effect resin cure and to remove water, the dried combustible product made from the composition has physical properties meeting the high standards required for ballistics applications. Furthermore the wet strength of the fibrous product during the compacting, matting or molding stage is found adequate for handling of the wet mass without crumbling.

The composition of this invention is useful in the manufacture of combustible products containing nitrocellulose fibers in felted form. The composition is particularly useful in the manufacture of combustible cartridge casings. Combustible products prepared by practice of this invention can be shaped into a variety of forms depending on the intended use of the product. Thus, the product can be shaped in the form of flat sheet, tape of suitable thinness, hollow forms, tubing, foraminous sheets, and specific molded shapes, such as that of a cartridge casing. The product also can be cut to any desired form. In each of these forms, the combustible properties of the product will be available as a source of heat energy and as a combustible product leaving little or no residue upon combustion. The amount of resin binder present can be varied to make the product rigid or more or less flexible as desired for a particular use.

Processes for making combustible cartridge casings are known. See, for example, our U.S. Patent 3,139,355, issued June 30, 1964, for "Process for Making a Fibrous Cellulose and/or Nitrocellulose Product." Combustible cartridge cases also are discussed in Ordnance, vol. XLVII, No. 254, pages 231–234 (1962).

A principal objective in using a resin binder in a combustible cartridge casing formulation containing nitrocellulose and cellulose fibers is to obtain an overall rigidity in the cured casing so that dimensional requirements can be met and permanently retained. At the same time the product is made strong enough to resist impact and abrasion during handling and storage.

The use of resins as binders for fibrous felted cellulose materials is known in the felting art. However, while it may be expected that a resin which may be physically suitable for binding cellulose fibers may be useful for binding nitrocellulose, it cannot be expected that the resin will be compatible with nitrocellulose throughout manufacture and shelf-life of the felted product. It is critical that there be little or no degradation of the nitrocellulose in the wet stage, in the curing and drying stages, and during storage of the felted product. Accordingly, the resin used to bind nitrocellulose fibers must not contain ingredients which will react adversely with nitrocellulose. Also, the resin must serve adequately to seal the fibers so that when the combustible product is placed in direct contact with a propellant material containing a material which has a tendency to migrate, e.g., nitroglycerin in a double base propellant, adsorption will be minimal. Moreover, the resin upon combustion should not leave substantial amounts of residues such as halogens, sulfur or metals which will contaminate a weapon in which the combustible cartridge case is used, and the resin itself must be sufficiently combustible so that efficiency of the product as a combustible material is not impaired.

According to the present invention, a particularly advantageous thermosetting resin composition has been found which meets the above necessary binder requirements. The composition is a copolymer of vinyl acetate with a comonomer having at least one functional group as described above. The copolymer is characterized in that it is of the class known as "self-reactive." The class possesses two chemical characteristics which are common to all types of "self-reactive" thermosetting resins. First, there is present in the resin molecule a resinous "backbone" built up by vinyl additive polymerization of the comonomers used. Second, there are spaced along this "backbone" dormant pendant functional groups originally present in the comonomers used, which are capable of further reaction. This class of polymers requires heating, occasionally in the presence of a trace of catalyst, above a certain threshold temperature to cause the pendant functional groups to react. The resulting product is a highly cross-linked polymer network. In the backbone of the copolymers used in the practice of the present invention, at least 90% of the molecular weight of the molecule is derived from vinyl acetate.

The polyvinyl acetate copolymers which can be used in the process of my invention are copolymers of vinyl acetate with any polymerizable monomer having the necessary functional group, as described above, which can react by cross-linking with the pendant methoxy groups derived from the vinyl acetate molecules.

Examples of such copolymers are vinyl acetate in combination with at least one of the following comonomers in the ratio of at least 90:10 parts by weight of vinyl acetate to comonomer:

(1) Aromatic epoxy, e.g., bisphenol A-epichlorhydrin, which provides an epoxy, or glycidyl, functional group,

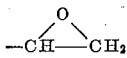

(2) Lower alkenyl alcohol, e.g., methallyl alcohol, $CH_2=C(CH_3)CH_2OH$, which provides a methylol group, $-CH_2OH$;
(3) Lower alkenyl urea, e.g., 1-allyl urea, $$CH_2=CHCH_2NHCONH_2$$

which provides an ureido group, $-NHCONH_2$;
(4) Hydroxylated vinyl acetate, which provides an hydroxyl group, $-OH$;
(5) Lower alkenyl amide, e.g., acrylamide, $$CH_2=CHCONH_2$$

which provides an amine group, $-NH_2$;
(6) Lower alkyl alkenyl amide, e.g., n-methyl acrylamide, $CH_2=CHCONHCH_3$, which provides an alkyl amine group, $-NHCH_3$;
(7) Acrylic acid, $CH_2=CHCOOH$, which provides a carboxyl group, $-COOH$; and
(8) Alkyl ester of acrylic acid, e.g., ethyl acrylate, $CH_2=CHCOOC_2H_5$, which provides an alkoxycarbonyl group, $-COOC_2H_5$.

Examples of preferred copolymers are vinyl acetate in combination with (1) alkyl esters of acrylic and methacrylic acid such as methyl acrylate, methyl methacrylate, ethyl acrylate, ethyl methacrylate, etc.; (2) substituted or unsubstituted mono and dialkyl esters of alpha, beta-unsaturated dicarboxylic acids such as the substituted and unsubstituted mono and dibutyl, mono and diethyl maleate esters as well as the corresponding fumarates, itaconates and citraconates; (3) anhydrides of alpha, beta-unsaturated dicarboxylic acids such as the anhydrides of maleic, fumaric, itaconic and citraconic acids; and (4) alpha, beta-unsaturated carboxylic acids such as crotonic, acrylic, methacrylic, fumaric, maleic, itaconic and citraconic acids.

Especially preferred copolymers are vinyl acetate in combination with (1) methyl methacrylate, (2) diethyl fumarate (3) anhydride of fumaric acid, and (4) acrylic acid.

Methods for preparation of the self-reactive resins used in practice of the invention are known in the art. Manufacturers of such resins can provide water-emulsified resins of specified viscosities, pH ranges, solids content, cure temperatures and water tolerances. For practice of this invention, it is preferred that the binder resin used have a Brookfield viscosity of at least 1500 cps. at 80° F., and that it have a solids content of about 50–60% by weight. It is also preferred that the resin be in the neutral or slightly acidic pH range, preferably having a pH of about 4.5 to 5.0. The resin can also contain a stabilizer, e.g., polyvinyl alcohol. Manufacture of such resin is not part of the present invention.

The specific amount of a specific resin required to produce the desired physical properties for a particular application can, of course, be easily determined by routine test. The amount of resin binder in the composition of the invention must be adequate to provide rigidity and high tensile strength in the final product when rigidity and strength are necessary properties in the combustible product, e.g., in a combustible cartridge casing. When a flexible combustible product is desired, less binder can be used. However, the amount of resin must not be so great that it will destroy the porosity of the product and interfere with its combustion rate. The amount must be adequate to provide rigidity and to maintain physical dimensions within tolerances required in the combustible product.

The amount of resin binder used in the composition of the invention, on a dry weight basis, can range from a ratio of 1 part resin to about 1 part mixed fibers to a ratio of 1 part resin to about 7 parts mixed fibers. Preferably the amount used is in the range of 1 part resin to 1.5 parts mixed fibers. About 20 to 30% of the resin binder is retained by the wet fibers after the bulk of the water is removed as filtrate during the deposition stage.

The amount of cured resin binder in the dried combustible product formed by practice of the invention preferably will range from about 16% to about 33% by weight.

A catalyst may be used to accelerate cross-linking of the pendant groups at the curing temperature. Catalysts useful for this purpose are well-known in the art. A salt of a trivalent metal is advantageously used. The salt can be a nitrate, chloride, bromide, fluoride or iodide of aluminum, bismuth, chromium, or nickel. Chromium nitrate is preferably used. The amount of catalyst used should be sufficient to cause rapid curing of the resin.

The uncured resin binder as disclosed by this invention has the advantage that when it is deposited on the fibers of the mixture of nitrocellulose and cellulose an effective amount remains adhesively deposited on removal of the water phase of the dispersion by the usual physical means, e.g., filters.

In practicing the invention to prepare a combustible product, the fibers and resin binder can be mixed in advance of use in the absence of the catalyst. If a catalyst is used, the catalyst then can be added shortly before matting or deposition of the fibers on a forming structure is carried out.

Also, in practicing the invention, a small quantity of defoaming agent preferably is included in the composition when the resin binder is dispersed into the fiber mass in the water. Defoaming agents useful for practicing the invention are commercially available. A preferred one is polyethylene glycol, e.g., Polyglycol E–300.

Nitrocellulose fibers used in practice of the invention are known in the art. The nitrocellulose fibers can be derived from natural sources or they can be synthetically prepared by extrusion of nitrocellulose and disintegration of the extrudate. Nitrogen content of the nitrocellulose should be in the range of 10.5–13.5%.

Nitrocellulose derived from wood pulp or cotton linters and having 12.6% nitrogen content, viscosity of 12–15 seconds, and fineness of 86–110 is especially preferred for manufacture of a highly combustible cartridge casing and for practice of the invention.

It is known in the art to stabilize nitrocellulose by the incorporation of well-known stabilizers into a composition containing the nitrocellulose, and such stabilizers preferably are used to practice the invention. A preferred stabilizer is diphenylamine. The diphenylamine is preferably dissolved in an organic solvent, e.g., methanol, for ease in addition to the aqueous suspension containing the nitrocellulose fibers.

The cellulose fibers used as described herein can be any commercially employed in paper making such as sulfate, sulfite, rag and ground wood, bleached or unbleached. Synthetic fibers such as viscose rayon fibers also can be used. Bleached sulfate kraft fibers are preferred. The fibers can be used in the form of the slurry obtained from a beater, or in the form of dry fibers, which are then reslurried. The nitrocellulose fibers similarly can be employed in any commercially available form.

The fibers in the combustible product, in web or mat or shaped form, can consist almost entirely of nitrocellulose fibers. Fineness of the fibers is not critical and commercially available sizes of fibers are preferably used. The cellulose fibers serve to provide strength to the product and help to control other properties of the composite mat, such as rate of burning and flame temperature.

The ratio of nitrocellulose fibers to cellulose fibers will generally be determined by the intended application. Preferably, a mixture consisting of a major portion of nitrocellulose and a minor portion of cellulose fibers is used. A ratio in the range of 1:1 to 4:1 parts by weight of nitrocellulose to cellulose fibers is especially preferred.

The amount of water used in practicing the invention is not critical, and a quantity of water consistent with efficient dispersion of the fibers and resin binder in the form of a fluid mass should be used. Preferably about 300 to 800 parts by weight of water to 1 part of combined solids in the mass are used. The resin binder preferably is used in the form of a dispersion containing 50–60% solids and the nitrocellulose preferably is used as a wet slurry. Sufficient additional water then is added to disperse all the fibers freely and to attain homogenity of the mass when the binder is added and distributed in the slurry.

After deposition and compacting of the fibrous mass, heating is applied to cure the self-reactive copolymeric resin binder regardless of presence of added catalyst. Curing occurs at a temperature in the range 120°–210° F. A temperature of about 180° F. is preferably used. Curing preferably is carried out as part of the drying step which necessarily is used to remove moisture from the deposited product.

Drying of the fibrous deposited mass is carried out by heating the mass at moderately elevated temperatures. Vacuum can be advantageously used during the drying step. Although sensitivity of the nitrocellulose is reduced by the presence of the resin binder, excessively high temperatures during drying must be avoided in order to prevent auto-ignition of the mass.

Preparation and use of the composition of this invention is described in the following examples. Unless otherwise stated, all parts are by weight.

*Example 1*

4 parts of dry, bleached kraft fiber are slurried in 1940 parts of water and beaten in an Osterizer high speed mixer for about one minute. 24 parts of water-wet nitrocellulose fibers (smokeless, 12.6% N, 15 seconds, approximately 25% water) are then added to the water-kraft fiber mixture, and the mass is then agitated for about another minute. 0.3 part of diphenylamine, dissolved in methanol, are then added to the mixture. 27 parts of an aqueous dispersion of copolymer of vinyl acetate in combination with methylmethacrylate in the ratio of 96:4 parts by weight, containing 19.5 parts of water-dispersed resin (dry weight basis) and having a Brookfield viscosity of about 1500 cps. at 72° F. are mixed with 0.5 part of Polyglycol E-300 defoamer. The resin binder dispersion is then added to the mixer containing the mixture of fibers. The mass is agitated for about another three minutes, or until the resin binder is thoroughly dispersed in the mass. The slurry is now ready for use to prepare fibrous mats or shaped forms.

*Example 2*

A portion of the mass of slurry prepared as described in Example 1 was filtered on a Büchner funnel under vacuum using 50 mesh wire screen to retain the fibers. Excess water was removed by pulling air through the mat which formed. Application of the vacuum was continued until substantially all of the liquid in the slurry had passed through. Analysis of the filtrate showed a retention of about 30% of the resin binder in the matted fibers.

*Example 3*

The impregnated mat from Example 2 was removed from the funnel, pressed for one minute at 200 p.s.i., using a Carver press, and then cured and oven-dried for one hour at 165° F.

The dried mat burned satisfactorily when ignited, leaving substantially no residue.

*Example 4*

A portion of the slurry prepared as described in Example 1 was introduced into a mold adapted for deposition of a felting on a mandrel in the form of a cartridge casing. Analysis of filtrate from the deposited filter fibers showed that about 25% of the original copolymer resin binder content was deposited on the fibers. The wet deposited cartridge casing was removed from the mold, placed on a drying mandrel, and placed in an oven at 160° F. until cured and dry (about fifty minutes). At the end of the drying period, the cartridge casing was found to be within production tolerances as to dimensional specifications. The cartridge casing was examined further and found to be impregnated uniformly with the copolymer resin binder. The casing was tough hard, smooth surfaced, and in water test, found to be moisture resistant. Tests on a Tinius-Olsen testing machine showed a sample of the casing sidewall calipering about 0.160 inch to have average maximum tensile stress of about 700 p.s.i. at 80° F. and to have a Young's modulus of about 48,000 p.s.i. Heat stability by methyl violet test was 135 minutes at 134.5° C. The cartridge case was ignited and was found to burn satisfactorily, leaving substantially no residue.

*Example 5*

Following the general procedure of Example 1, 10 parts of the kraft fiber, about 15 parts of the wet nitrocellulose, and 0.2 part of the diphenylamine are homogeneously blended in about 1900 parts of water. 44 parts of an aqueous dispersion of copolymer of vinyl acetate in combination with acrylic acid in the ratio of 92:8 parts by weight, containing 20 parts of water-dispersed resin (dry weight basis) and having a Brookfield viscosity of about 2500 at 72° F. are mixed with 1 part of chromium nitrate and stirring continued until homogeneous. The copolymer is then added to the slurry of fibers and the mass stirred until homogeneous.

A combustible cartridge casing prepared from the slurry according to the general procedure of Example 4 was found to have an average maximum tensile stress of about 2000 p.s.i. at 80° F. and a Young's modulus of about 248,000 p.s.i. The ratio of the fibers to the copolymer binder was found to be about 1:1. The cartridge case ignited readily and burned cleanly, leaving no significant amount of residue.

Although this invention has been described with reference to illustrative embodiments thereof, it will be apparent to those skilled in the art that the principles of this invention may be embodied in other forms within the scope of the appended claims.

We claim:

1. A composition for making a shaped, felted, and fibrous combustible product, having high tensile strength when cured and dried said composition comprising (a) nitrocellulose fibers, (b) cellulose fibers, (c) resin binder compatible with said nitrocellulose, said binder consisting essentially of water-dispersed thermosetting adhesive resin composition comprising a self-reactive, aqueous emulsion copolymer containing at least 90%, by weight, of vinyl acetate together with at least one other polymerizable comonomer containing at least one functional group selected from the group consisting of the glycidyl, methylol, ureido, hydroxyl, amine, carboxyl, and alkoxycarbonyl groups, and (d) water.

2. The composition according to claim 1 in which the comonomer contains a methylol group.

3. The composition according to claim 1 in which the comonomer contains an ureido group.

4. The composition according to claim 1 in which the comonomer contains an amine group.

5. The composition according to claim 1 in which the comonomer contains a carboxyl group.

6. The composition according to claim 1 in which the comonomer contains an alkoxycarbonyl group.

7. The composition according to claim 1 in which the nitrocellulose/cellulose/resin are present in proportions of 1–5/1–2/1 parts by weight.

8. The composition according to claim 1 in which there is present a catalyst for cross-linking of said copolymer.

9. The composition according to claim 6 in which the catalyst is chromium nitrate.

10. A composition for making a shaped, felted and fibrous combustible product having high tensile strength when cured and dried comprising a homogeneous dispersion in from about 350 to 2000 parts by weight of water of the following ingredients: (a) dispersed fibers consisting essentially of 1 to about 99 parts of nitrocellulose fibers and 1 to 5 parts of cellulose fibers and (b) resin binder compatible with said nitrocellulose, said binder consisting essentially of self-reactive copolymer containing at least 90%, by weight, of vinyl acetate in combination with up to 10% of methyl methacrylate, the dry weight ratio of the binder to the mixture of fibers being in the range of from about 1:1 to about 1:7.

11. The method of making a rigid felted, fibrous combustible product comprising homogeneously mixing nitrocellulose fibers; cellulose fibers; water dispersed resin binder compatible with said nitrocellulose, said binder consisting essentially of water-dispersed thermosetting adhesive resin composition comprising a self-reactive, aqueous emulsion copolymer containing at least 90%, by weight, of vinyl acetate together with at least one other polymerizable comonomer containing at least one functional group selected from the group consisting of the glycidyl, methylol, ureido, hydroxyl, amine, carboxyl, and alkoxycarbonyl groups; and water; removing a major amount of water to leave a wet fibrous mass; compacting said mass; and heating said mass at a curing temperature for said binder until substantially moisture-free.

12. The method according to claim 11 in which the comonomer contains a methylol group.

13. The method according to claim 11 in which the comonomer contains an ureido group.

14. The method according to claim 11 in which the comonomer contains an amine group.

15. The method according to claim 11 in which the comonomer contains a carboxyl group.

16. The method according to claim 11 in which the comonomer contains an alkoxycarbonyl group.

17. A process for preparing rigid, shaped, felted, fibrous combustible product having high tensile strength when cured and dried comprising the steps of (a) treating a homogenous aqueous mixture consisting essentially of an aqueous suspension of 1 to about 5 parts of nitrocellulose and about 1 to 2 parts of cellulose fibers, and 2 parts of resin binder consisting essentially of resin binder compatible with said nitrocellulose, said binder consisting essentially of water-dispersed thermosetting adhesive resin composition comprising a self-reactive, aqueous emulsion copolymer containing at least 90%, by weight, of vinyl acetate together with at least one other polymerizable comonomer containing at least one functional group selected from the group consisting of the glycidyl, methylol, ureido, hydroxyl, amine, carboxyl, and alkoxycarbonyl groups, (b) removing excess water from said mixture to deposit a fibrous mass, (c) compacting said mass, and (d) heating said mass at a curing temperature for said binder until substantially moisture-free.

18. A felted fibrous combustible cartridge casing comprising a major amount of nitrocellulose fibers and a minor amount of cured resin binder compatible with said nitrocellulose, said binder consisting essentially of thermosetting adhesive resin composition comprising self-reactive copolymer containing at least 90%, by weight, of vinyl acetate together with at least one other polymerizable comonomer containing at least one functional group selected from the group consisting of glycidyl, methylol, ureido, hydroxyl, amine, carboxyl, and alkoxycarbonyl groups.

References Cited by the Examiner

UNITED STATES PATENTS 3,139,355    6/1964    De Fries et al. _____ 149—2 X

BENJAMIN R. PADGETT, *Primary Examiner.*